(12) United States Patent
Kakuta

(10) Patent No.: US 7,527,390 B2
(45) Date of Patent: May 5, 2009

(54) LIGHT SOURCE DEVICE

(75) Inventor: Yoshinori Kakuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 11/648,822

(22) Filed: Jan. 3, 2007

(65) Prior Publication Data

US 2007/0268704 A1 Nov. 22, 2007

(30) Foreign Application Priority Data

May 22, 2006 (JP) ............................. 2006-141616

(51) Int. Cl.
*F21V 7/00* (2006.01)
(52) U.S. Cl. ..................... 362/247; 362/231; 362/296; 362/347; 362/800
(58) Field of Classification Search ................ 362/800, 362/216, 227, 228, 230, 231, 232, 235, 247, 362/249, 296, 341, 347
See application file for complete search history.

(56) References Cited

U.S. PATENT DOCUMENTS

| 7,150,553 | B2* | 12/2006 | English et al. | 362/545 |
| 7,152,996 | B2* | 12/2006 | Luk | 362/240 |
| 2002/0136010 | A1* | 9/2002 | Luk | 362/250 |
| 2003/0016536 | A1* | 1/2003 | Lin | 362/250 |
| 2003/0063476 | A1* | 4/2003 | English et al. | 362/545 |
| 2003/0193802 | A1* | 10/2003 | Luk | 362/249 |

FOREIGN PATENT DOCUMENTS

JP 2005-292642 A 10/2005

* cited by examiner

*Primary Examiner*—Laura Tso
(74) *Attorney, Agent, or Firm*—Birch, Stewart, Kolasch & Birch, LLP

(57) ABSTRACT

A light source device includes a first spheroidal mirror having first and second focal points, and a light source unit having a plurality of semiconductor light emitting elements radially disposed on a support with respect to the axis of rotation of the first spheroidal mirror. Light beams from the semiconductor light emitting elements pass through the second focal point, reflect from the inner surface of the first spheroidal mirror, and are focused to the first focal point, and the axis of rotation and the light emission central axis of each of the semiconductor light emitting elements form an angle of 90 degrees or greater. The light source unit is removably attached to an opening provided at a non-reflective portion of the first spheroidal mirror so as to form an illumination unit.

6 Claims, 9 Drawing Sheets

Prior Art.

LIGHT SOURCE DEVICE

BACKGROUND OF THE INVENTION

1. Field of the Invention

The present invention relates to a light source device used for a projection-type display apparatus.

2. Description of the Related Art

In a conventional light source device, as shown in FIG. 9, emission light emitted from semiconductor light emitting elements 80 and 81 is collimated by collector lenses 82 and 83, respectively, reflected from a parabolic mirror 84 and focused to the focal point 85 of the parabolic mirror 84.

The focused emission light reflects from the inner surface of a light integrator 86 multiple times, passes through relay lenses 87, 88 and 89, and illuminates a light valve (liquid crystal panel) 60.

The light valve 60 controls the emission light from the semiconductor light emitting elements 80 and 81 according to an image from an image signal processing circuit (not shown) to generate that image. The image generated by the light valve 60 is enlarged and projected through a projection lens 61 onto a screen 62.

Radiator fins 90 are provided to prevent the decrease in brightness of the semiconductor light emitting elements 80 and 81 due to their own heat.

The radiator fins 90 are disposed on the opposite side of a substrate 91 from the side on which the semiconductor light emitting elements 80 and 81 are disposed such that a cooling fan (not shown) provides cooling for the radiator fins 90 (see JP-A-2005-292642, for example).

SUMMARY OF THE INVENTION

In the conventional light source device described in JP-A-2005-292642, when the semiconductor light emitting elements have reached their service life or failed, the light integrator also needs to be removed at the same time in order to replace the semiconductor light emitting elements with new ones, resulting in a cumbersome replacement process of the semiconductor light emitting elements disposed in the light source device. That is, the replacement of the semiconductor light emitting elements disposed in the light source device cannot be easily performed.

On the other hand, in recent years, there has been an increasing demand for a brighter light source device to be applied to a projection-type display apparatus.

The invention has been made to solve such problems and aims to provide a brighter light source device that allows for easy replacement of a semiconductor light emitting element disposed therein.

The light source device according to the invention includes a first spheroidal mirror having first and second focal points, and a light source unit having a plurality of semiconductor light emitting elements radially disposed on a support with respect to the axis of rotation of the first spheroidal mirror. Light beams from the semiconductor light emitting elements pass through the second focal point, reflect from the inner surface of the first spheroidal mirror, and are focused to the first focal point, and the axis of rotation and the light emission central axis of each of the semiconductor light emitting elements form an angle of 90 degrees or greater. The light source unit is removably attached to an opening provided at a non-reflective portion of the first spheroidal mirror so as to form an illumination unit.

Since the light source device of the invention includes the light source unit in which the light beams from the semiconductor light emitting elements pass through the second focal point and are focused to the first focal point and the axis of rotation and the light emission central axis of each of the semiconductor light emitting elements form an angle of 90 degrees or greater, and the light source unit is removably attached to the opening provided at the non-reflective portion of the first spheroidal mirror, the semiconductor light emitting elements disposed in the light source unit can be replaced by pulling out the light source unit from the first spheroidal mirror in the backward direction, allowing easy replacement of the semiconductor light emitting elements.

Furthermore, since each emission light does not interfere with semiconductor light emitting elements disposed substantially on the opposite side, more semiconductor light emitting elements can be disposed to increase the brightness of the light source device.

Even when one of the plurality of semiconductor light emitting elements has failed so that no emission light is provided from that semiconductor light emitting element, significant reduction in brightness can be avoided.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
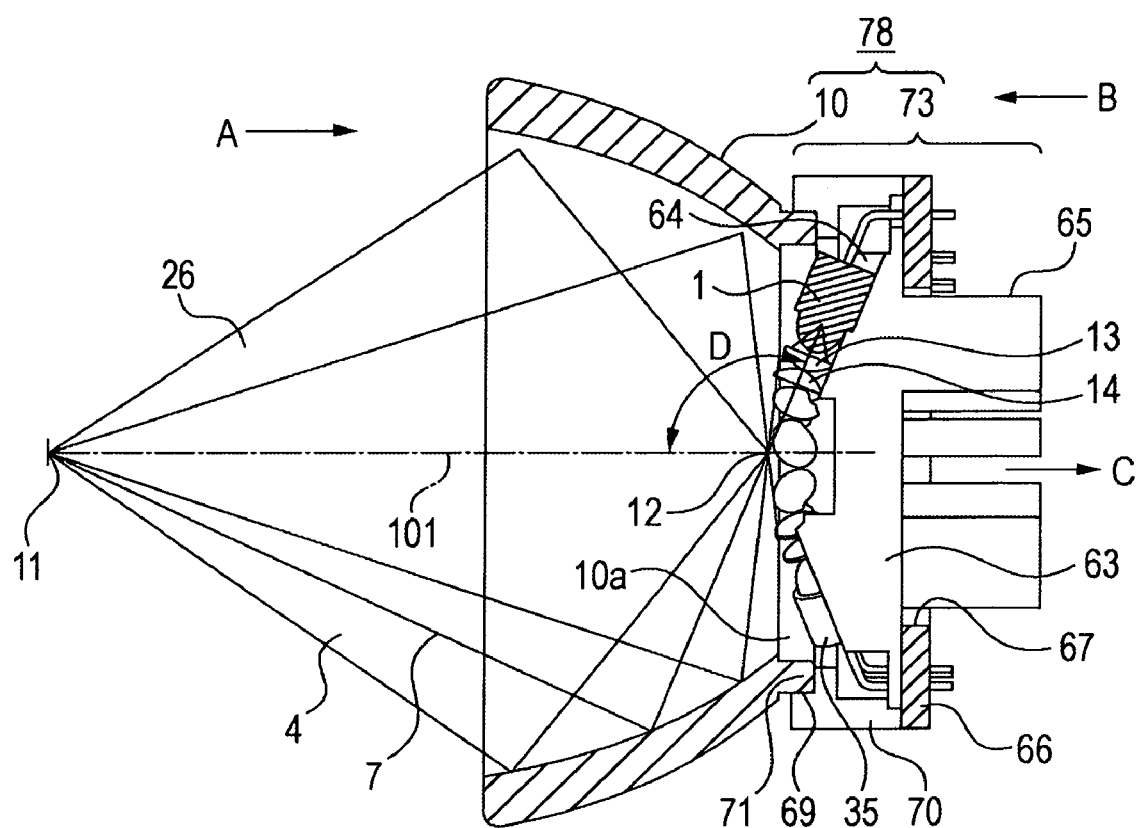
FIG. 1 is a side cross-sectional view of the light source device according to a first embodiment of the invention.

Embodiments of the invention will be described below with reference to the drawings.

The same reference characters refer to the same or corresponding parts throughout the drawings.

FIRST EMBODIMENT

Figure 2:
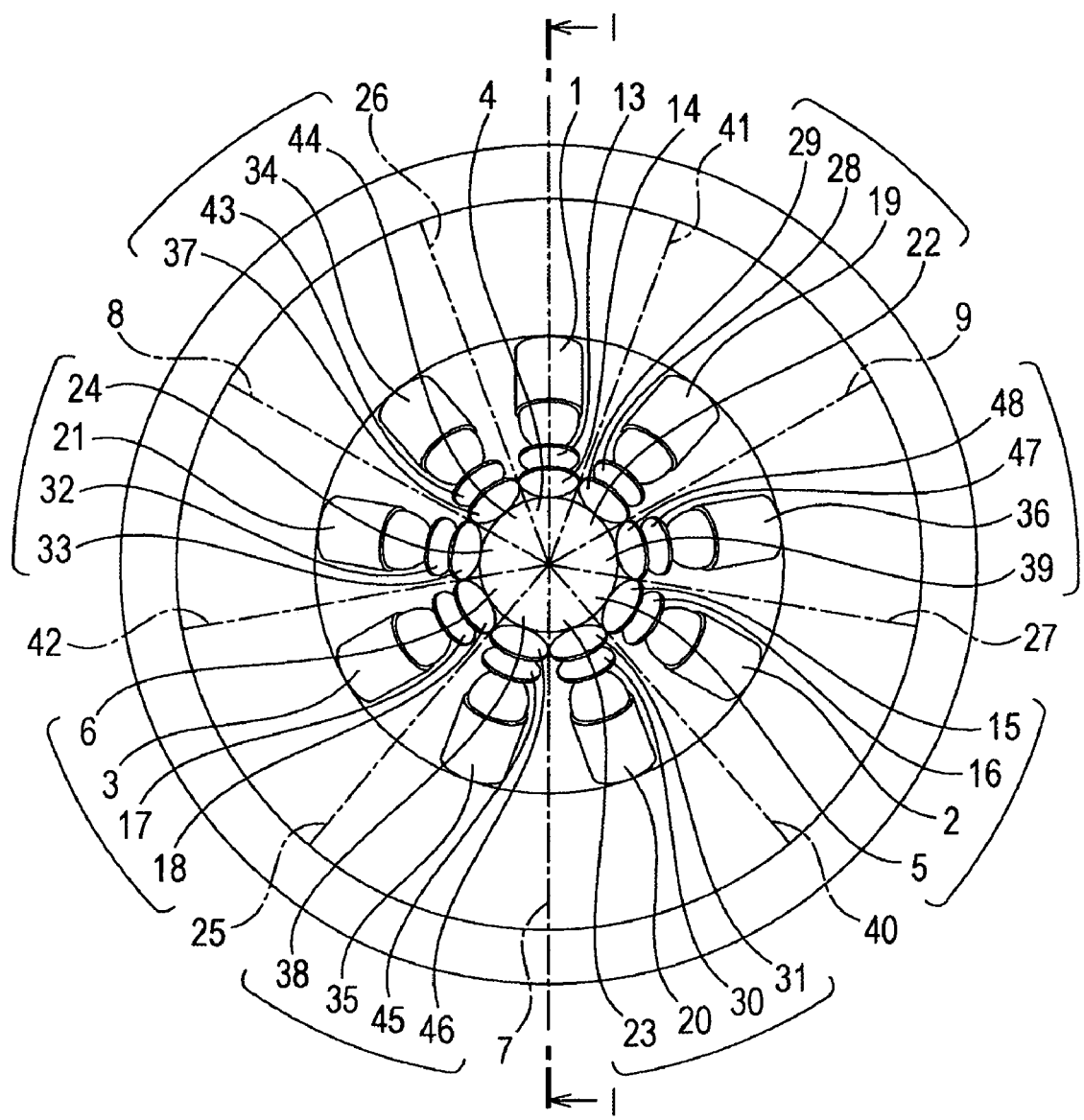
FIG. 2 is a front view of the light source device according to the first embodiment of the invention.
Figure 3:
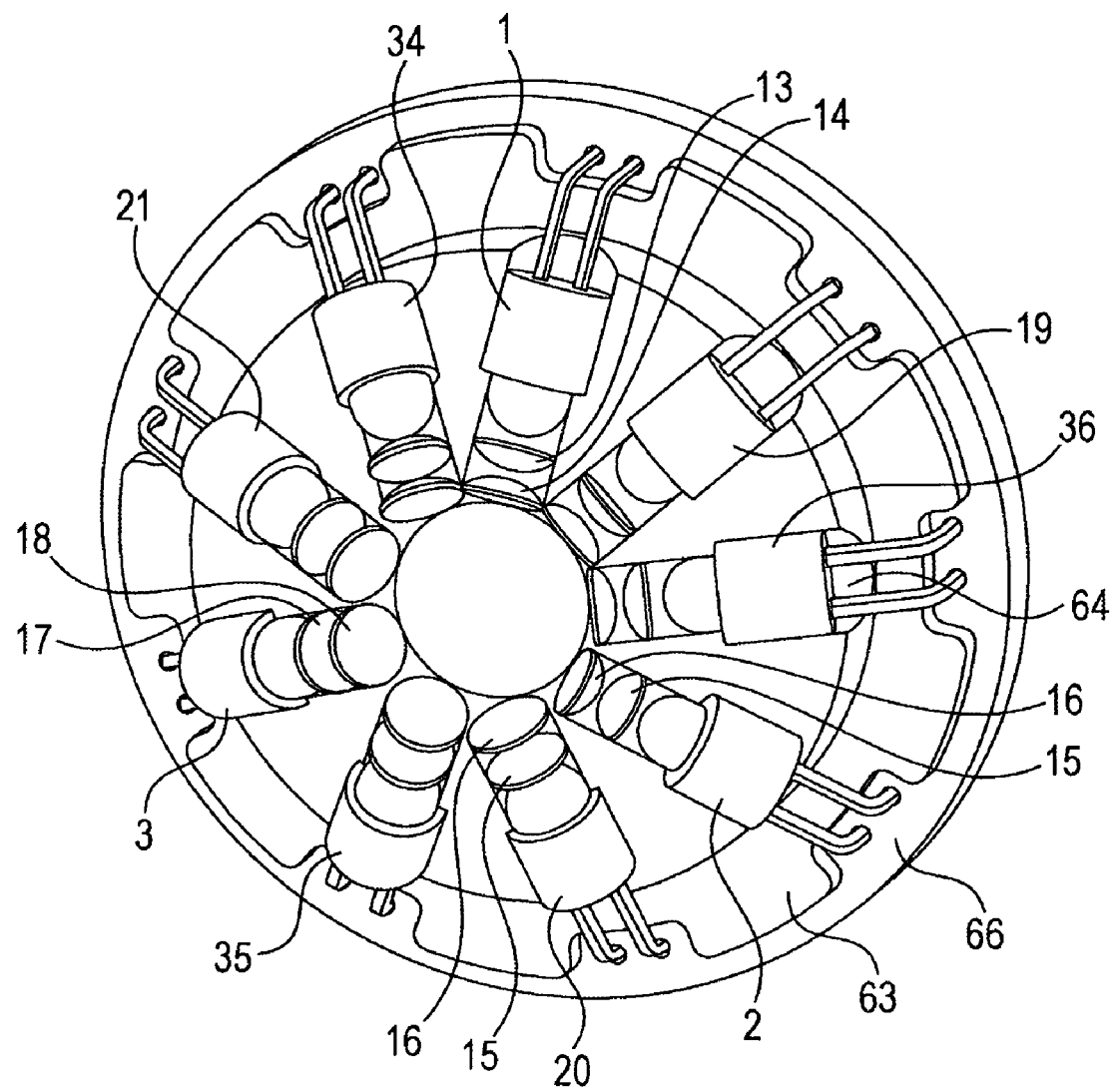
FIG. 3 is a perspective view of the light source device according to the first embodiment of the invention.
Figure 4:
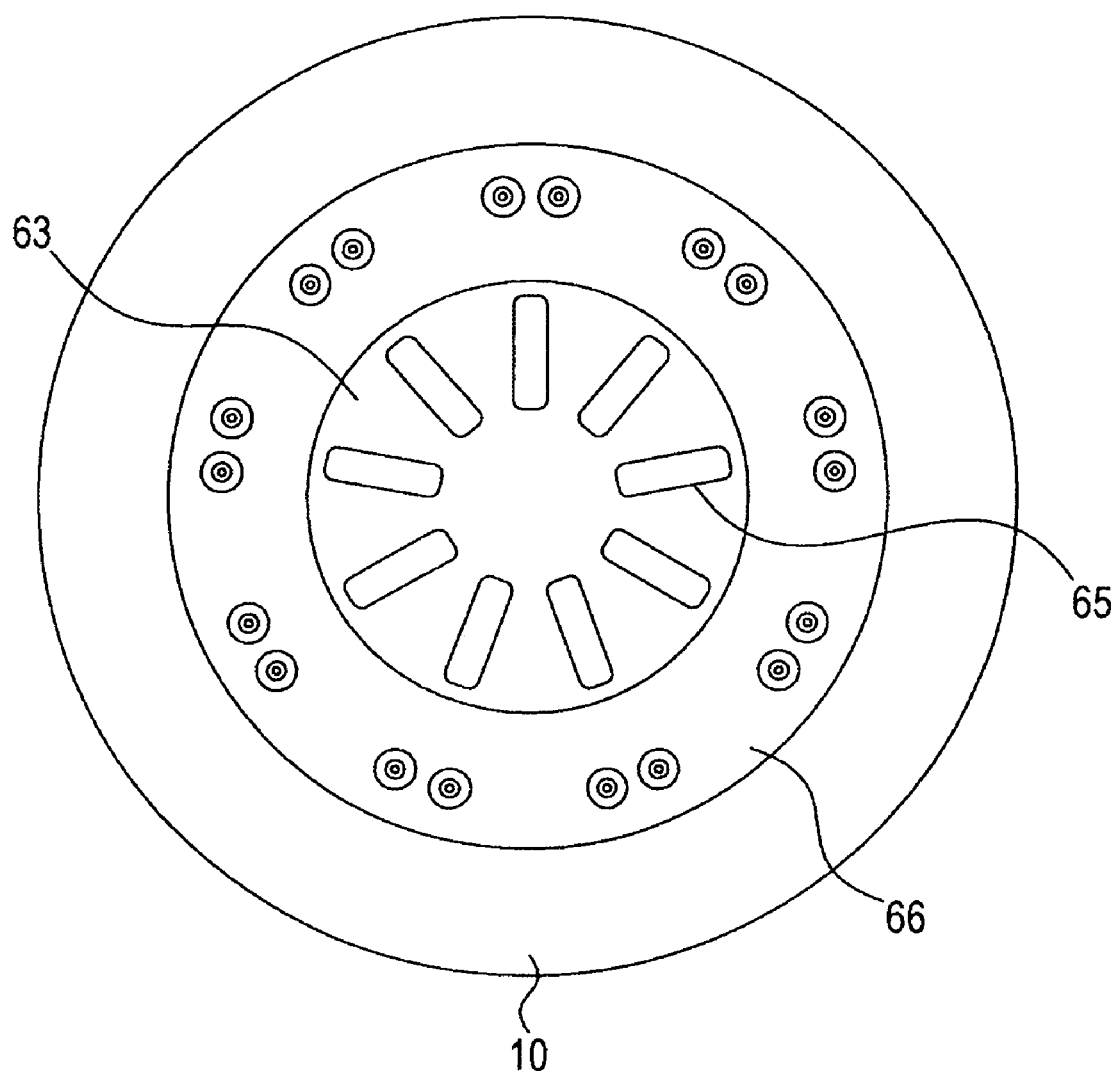
FIG. 4 is a rear view of the light source device according to the first embodiment of the invention.

FIGS. 1 to 4 show the light source device according to a first embodiment of the invention used in a projection-type display apparatus. FIG. 1 is side cross-sectional view taken along the line I-I shown in FIG. 2 and viewed in the direction indicated by the arrow. FIG. 2 is a front view when viewed in the direction indicated by the arrow A shown in FIG. 1. FIG. 3 is a perspective view of FIG. 2 when viewed from a diagonal direction. FIG. 4 is a rear view when viewed from the direction indicated by the arrow B shown in FIG. 1.

An illumination unit 78 formed of a light source unit 73 and a first spheroidal mirror 10 will be described below with reference to FIGS. 1 to 4.

The light source unit 73 includes, as described later, a plurality of semiconductor light emitting elements, collector lenses, and a support (such as a base, holder and substrate).

Firstly, the semiconductor light emitting elements, the collector lenses and the first spheroidal mirror in the light source unit 73 will be described.

In FIGS. 1 to 4, semiconductor light emitting elements 1, 2 and 3 that emit light at a red wavelength are configured such that the light-emission central axes 7, 8 and 9 (dashed lines) of emission light 4, 5 and 6 from the semiconductor light emitting elements 1, 2 and 3 are radially disposed with respect to the axis of rotation 101 of the first spheroidal mirror (hereinafter referred to as "first ellipsoidal mirror") 10 and spaced apart by approximately 120 degrees.

As shown in FIG. 1, the mirror surface of the first ellipsoidal mirror 10 has a first focal point 11 and a second focal point 12 determined by its ellipsoidal curvature.

The emission light 4 that is emitted from the semiconductor light emitting element 1 at approximately 60 degrees in a divergent manner is refracted when it passes through collector lenses 13 and 14 and focused to the second focal point 12. Thereafter, the emission light 4 is reflected from the inner surface of the first ellipsoidal mirror 10 and focused again to the first focal point 11.

Similarly, in the semiconductor light emitting elements 2 and 3 that emit light at the red wavelength, as in the semiconductor light emitting element 1, emission light 5 and 6 is refracted when the emission light 5 and 6 passes through collector lenses 15, 16 and 17, 18, respectively, and focused to the second focal point 12. Thereafter, the emission light 5 and 6 is reflected from the inner surface of the first ellipsoidal mirror 10 and focused again to the first focal point 11.

Semiconductor light emitting elements 19, 20 and 21 that emit light at a green wavelength are configured such that the light-emission central axes 25, 26 and 27 of emission light 22, 23 and 24 from the semiconductor light emitting elements 19, 20 and 21 are radially disposed with respect to the axis of rotation 101 of the first ellipsoidal mirror 10 and spaced apart by approximately 120 degrees, as in the semiconductor light emitting elements 1, 2, and 3. The semiconductor light emitting elements 19, 20 and 21 are spaced apart from the semiconductor light emitting elements 1, 2 and 3 in the rotational direction of the axis of rotation 101 by approximately 40 degrees clockwise. The positions to which the emission light 22, 23 and 24 is focused by collector lenses 28 and 29, 30 and 31, and 32 and 33, respectively, coincide with the second focal point 12.

Therefore, as in the semiconductor light emitting elements 1, 2 and 3, the emission light 22, 23 and 24 from the semiconductor light emitting elements 19, 20 and 21 is also focused to the second focal point 12, reflected from the inner surface of the first ellipsoidal mirror 10 and focused again to the first focal point 11.

Semiconductor light emitting elements 34, 35 and 36 that emit light at a blue wavelength are configured such that the light-emission central axes 40, 41 and 42 of emission light 37, 38 and 39 are radially disposed with respect to the axis of rotation 101 of the first ellipsoidal mirror 10 and spaced apart by approximately 120 degrees, as in the semiconductor light emitting elements 1, 2, 3, 19, 20 and 21. The semiconductor light emitting elements 34, 35 and 36 are spaced apart from the semiconductor light emitting elements 1, 2 and 3 in the rotational direction of the axis of rotation 101 by approximately 40 degrees counterclockwise. The positions to which the emission light 37, 38 and 39 is focused by collector lenses 43 and 44, 45 and 46, and 47 and 48, respectively, coincide with the second focal point 12.

Therefore, as in the semiconductor light emitting elements 1, 2, 3, 19, 20 and 21, the emission light 37, 38 and 39 from the semiconductor light emitting elements 34, 35 and 36 is focused to the second focal point 12, reflected from the inner surface of the first ellipsoidal mirror 10 and focused again to the first focal point 11.

Therefore, the emission light from the semiconductor light emitting elements 1, 2, 3, 19, 20, 21, 34, 35 and 36 will be all focused to the first focal point 11.

As shown in FIG. 1, the angle between the axis of rotation 101 passing through the focal point 12 and the light-emission central axes 7, 8, 9, 25, 26, 27, 40, 41 and 42, that is, the angle D formed by connecting the light emitting point of the semiconductor light emitting element, the second focal point 12 and the first focal point 11 is greater than or equal to 90 degrees, so that light emitted from a semiconductor light emitting element will not interfere with other semiconductor light emitting elements disposed substantially opposite to that semiconductor light emitting element.

Longer distance from the collector lenses 14, 16, 18, 29, 31, 33, 44, 46 and 48 to the second focal point 12 increases the space between adjacent semiconductor light emitting elements, allowing more semiconductor light emitting elements to be disposed.

Figure 5:
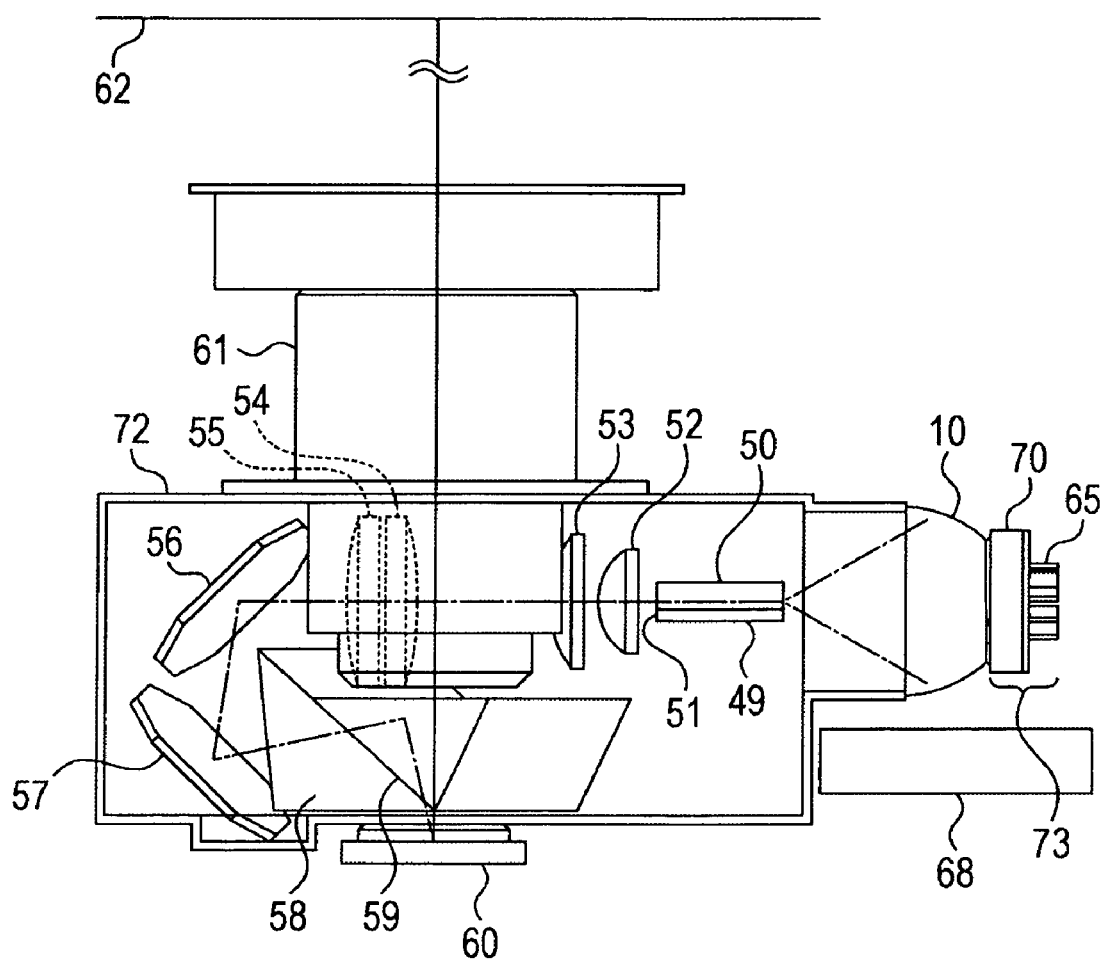
FIG. 5 is a cross-sectional view showing the main portion of an image display apparatus using the light source device according to the first embodiment of the invention.

FIG. 5 is a side cross-sectional view of the main portion of the light source device of the invention used in a projection-type display apparatus. In the figure, an entrance aperture 50 of a light integrator (a columnar light element that generates numerous secondary light sources) 49 is disposed at the first focal point 11.

The emission light 4, 5, 6, 22, 23, 24, 37, 38 and 39 from the semiconductor light emitting elements 1, 2, 3, 19, 20, 21, 34, 35 and 36 passes through the first focal point 11, diverges again, reflects from the inner surface of the light integrator 49 multiple times, exits from an exit aperture 51 of the light integrator 49 in a divergent manner, passes through relay lenses 52, 53, 54 and 55 and is refracted by the relay lenses to form a substantially collimated light beam, reflects from first and second reflection mirrors 56 and 57, enters a prism 58, reflects from a reflection surface 59 of the prism 58, and then illuminates a light valve (liquid crystal panel) 60.

The light valve 60 controls the reflection direction of the emission light according to an image signal from an image signal processing circuit (not shown) to generate an image, which is enlarged and projected through a projection lens 61 onto a screen 62.

A description will now be made of a configuration for attaching the light source unit 73 to an opening 10a of the first ellipsoidal mirror 10 using a support (a base 63, a substrate 66, a holder 70 and the like) in the illumination unit 78.

In FIGS. 1 to 5, each of the semiconductor light emitting elements 1, 2, 3, 19, 20, 21, 34, 35 and 36 is positioned, glued and secured in a groove 64 formed in the base 63. Similarly, the collector lenses 13, 14, 15, 16, 17, 18, 28, 29, 30, 31, 32, 33, 43, 44, 45, 46, 47 and 48 are positioned, glued and secured in the grooves 64, and maintain their positions to focus respective emission light to the second focal point 12.

The base 63 is made of material with high thermal conductivity, such as aluminum, and provided with radiator fins 65 integral with part of the back side of the base 63.

The substrate 66 is glued and secured on the back side of the base 63 and supplies a current required to cause light emission to the terminals of the semiconductor light emitting elements 1, 2, 3, 19, 20, 21, 34, 35 and 36 soldered onto the substrate 66.

The radiator fins 65 are inserted through a hole 67 formed in the central part of the substrate 66.

Therefore, the base 63 transmits the heat generated by light emission of the semiconductor light emitting elements to the radiator fins 65, and as shown in FIG. 5, a cooling fan 68 sends air to provide cooling for the radiator fins 65 so as to control the heat generation by the semiconductor light emitting elements.

As shown in FIG. 1, the holder 70 with a positioner 69 is provided around the outer circumference of the base 63. The holder 70 removably fits with a positioner 71 formed at the opening 10a for light source unit replacement and support purposes provided at the back side, that is, the non-reflective portion of the first ellipsoidal mirror.

As shown in FIG. 5, the first ellipsoidal mirror 10 is fixed to an enclosure 72 that accommodates various optical components, and then the positioner 71 fits in the positioner 69.

Thus, dust sucked along with the air sent by the cooling fan 68 from outside the apparatus will not attach to the surfaces of the lenses and mirrors in the light path through which the emission light 4, 5, 6, 22, 23, 24, 37, 38 and 39 passes until the emission light exits from the projection lens 61, so that the brightness of the light source device will not be reduced over a long period of operation due to attached dust.

Furthermore, since the radiator fins 65 are formed integral with the base 63 to which the semiconductor light emitting elements are directly attached, positioned and secured, and the radiator fins 65 are inserted through the hole 67 formed in the substrate 66 to which the semiconductor light emitting elements are soldered, dust entering from outside the apparatus along with the air for cooling the semiconductor light emitting elements will not attach to various optical components through which the emission light from the semiconductor light emitting elements passes, providing an advantage of preventing reduced brightness due to attached dust.

Moreover, when any one or all of the semiconductor light emitting elements 1, 2, 3, 19, 20, 21, 34, 35 and 36 have failed or reached its or their service life and hence no emission light is provided from that semiconductor light emitting element (s), or when the brightness is significantly reduced, the defective semiconductor light emitting element(s) can be replaced with a new one(s) (light source unit 73) without having to remove the first ellipsoidal mirror 10 and the light integrator 49.

Furthermore, during replacement of the semiconductor light emitting element (light source unit 73), no dust or grease will attach to the light integrator 49 or the reflection surface of the first ellipsoidal mirror 10, preventing degradation of image projection performance after the replacement of the light source device. Also, the light integrator 49 or the first ellipsoidal mirror 10 requires no replacement and allows continuous use, providing an advantage of reduced part replacement costs.

The light source unit 73 includes the semiconductor light emitting elements 1, 2, 3, 19, 20, 21, 34, 35 and 36, the collector lenses 13, 14, 15, 16, 17, 18, 28, 29, 30, 31, 32, 33, 43, 44, 45, 46, 47 and 48, the base 63, the substrate 66 and the holder 70 but does not include the first ellipsoidal mirror 10 or the light integrator 49.

As the light integrator 49 and the first ellipsoidal mirror 10 are coated with special materials to provide high reflectance of the reflection surfaces, so that they are relatively expensive optical components. If dust or grease is attached to the reflection surfaces during handling and the apparatus is used with the attached dust or grease, a projected image will be shadowed by the attached dust or grease and sufficient brightness will not be obtained.

Therefore, maintenance of the light source device is performed by pulling out the light source unit 73 in the direction indicated by the arrow C and fitting a new light source unit 73 in the positioner 71 of the first ellipsoidal mirror 10. In this procedure, an operator in charge of maintenance replaces the light source unit 73 by holding the holder 70 or the radiator fins 65 without removing the light integrator 49 or the first ellipsoidal mirror 10 from the enclosure 72, so that the operator will not touch the reflection surface of the light integrator 49 or the first ellipsoidal mirror 10.

SECOND EMBODIMENT

Figure 6:
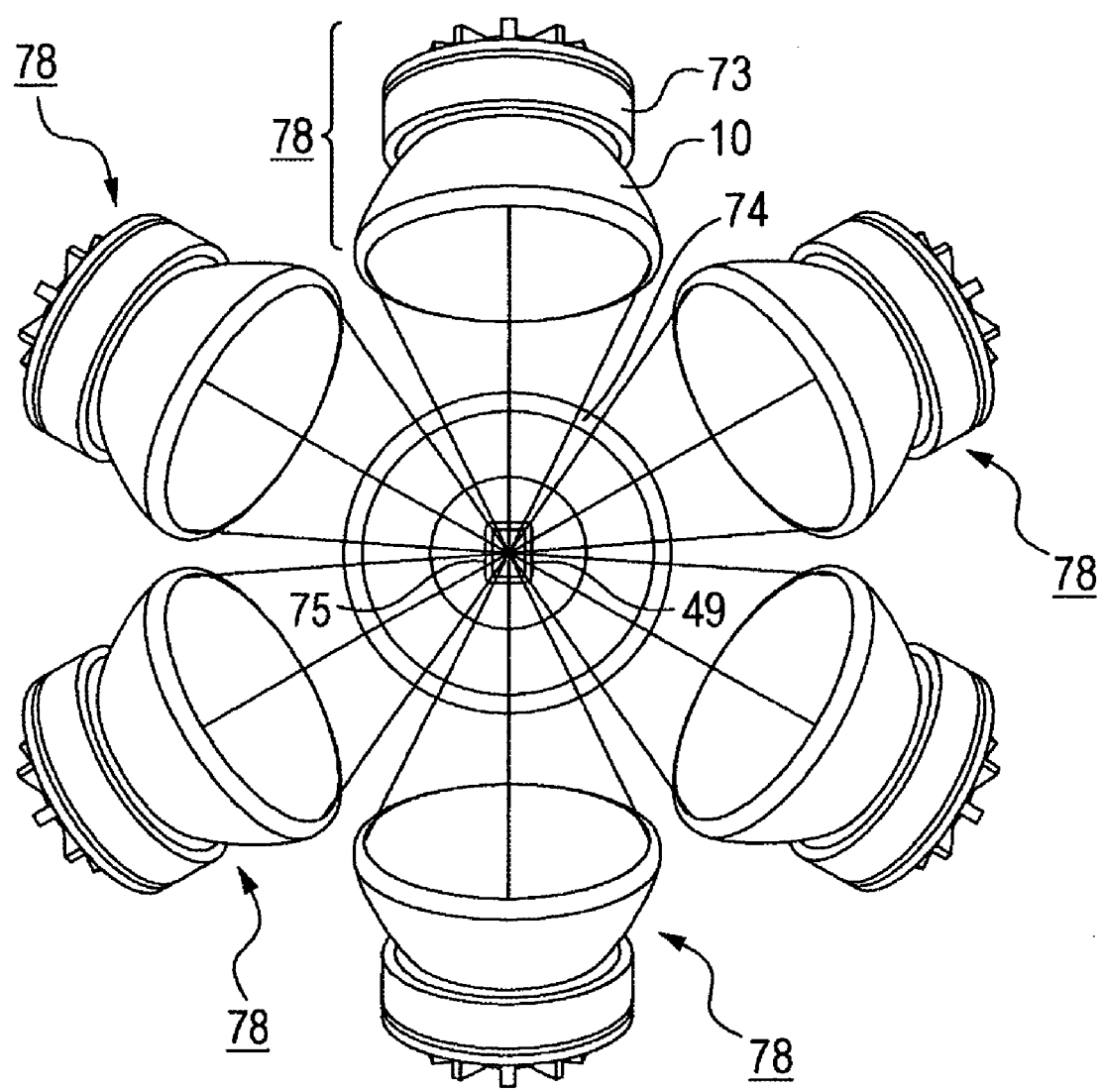
FIG. 6 is a front view of the light source device according to a second embodiment of the invention.
Figure 7:
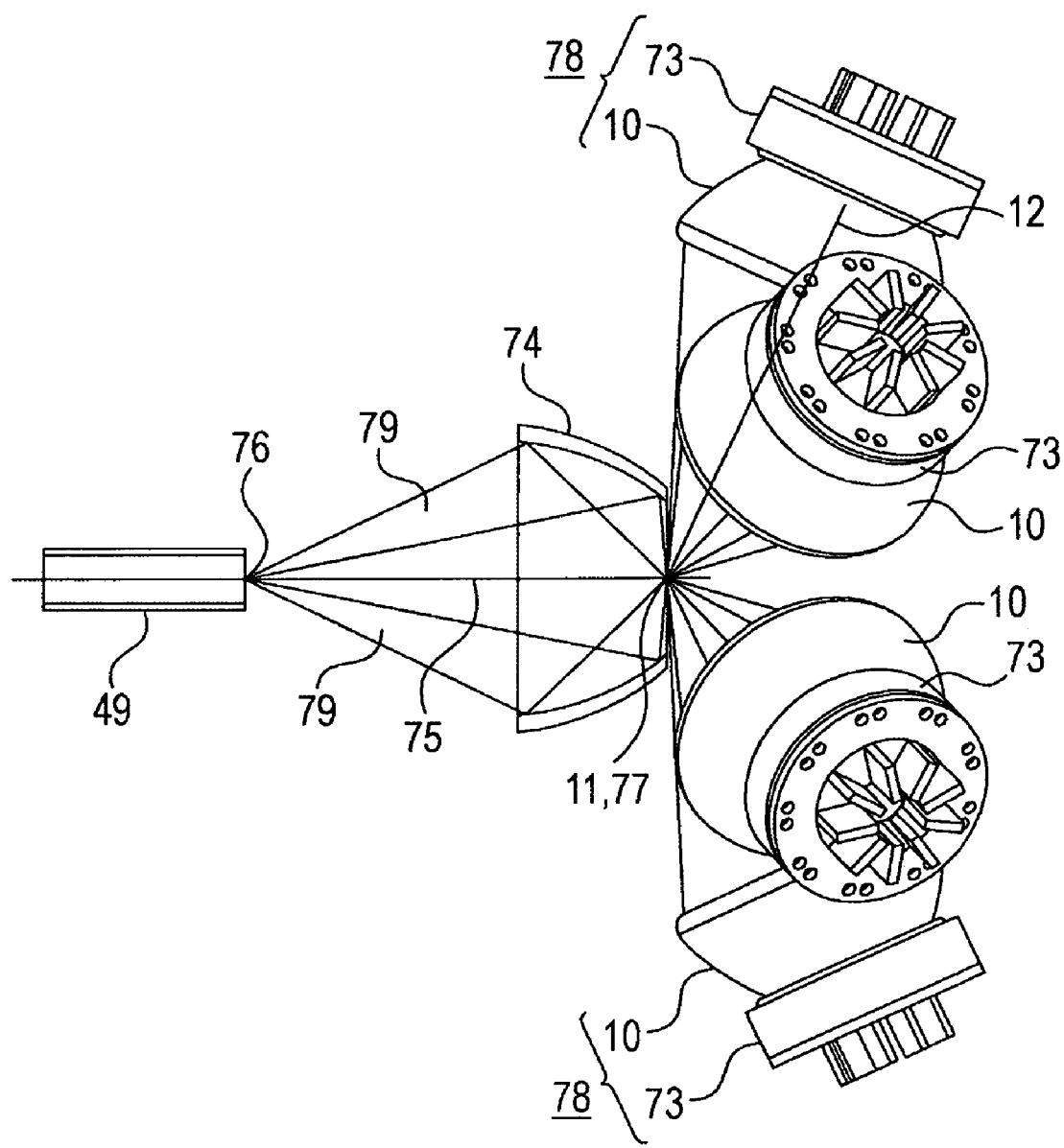
FIG. 7 is a side cross-sectional view showing the main portion of the light source device according to the second embodiment of the invention.
Figure 8:
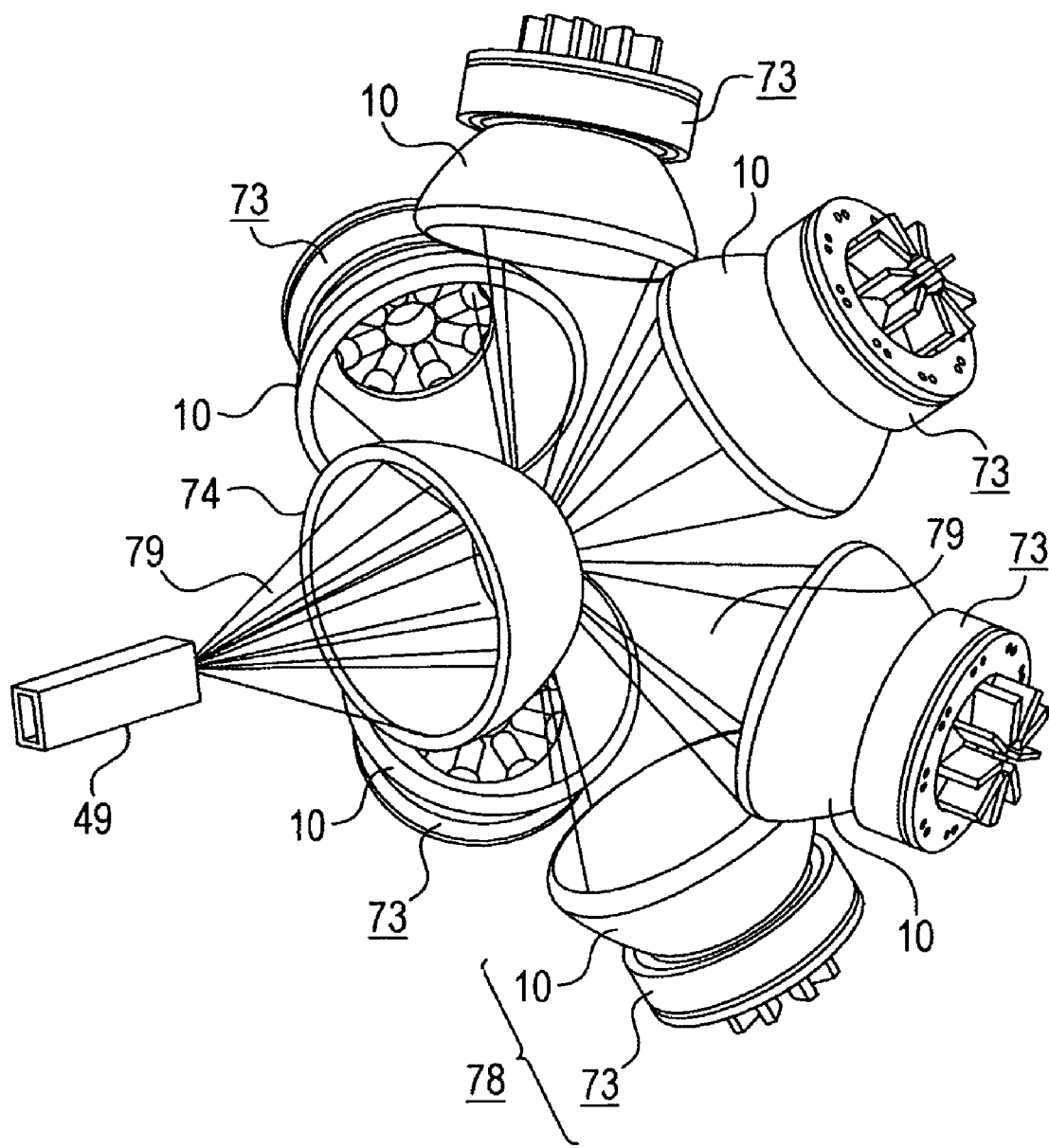
FIG. 8 is a perspective view of the light source device according to the second embodiment of the invention.
Figure 9:
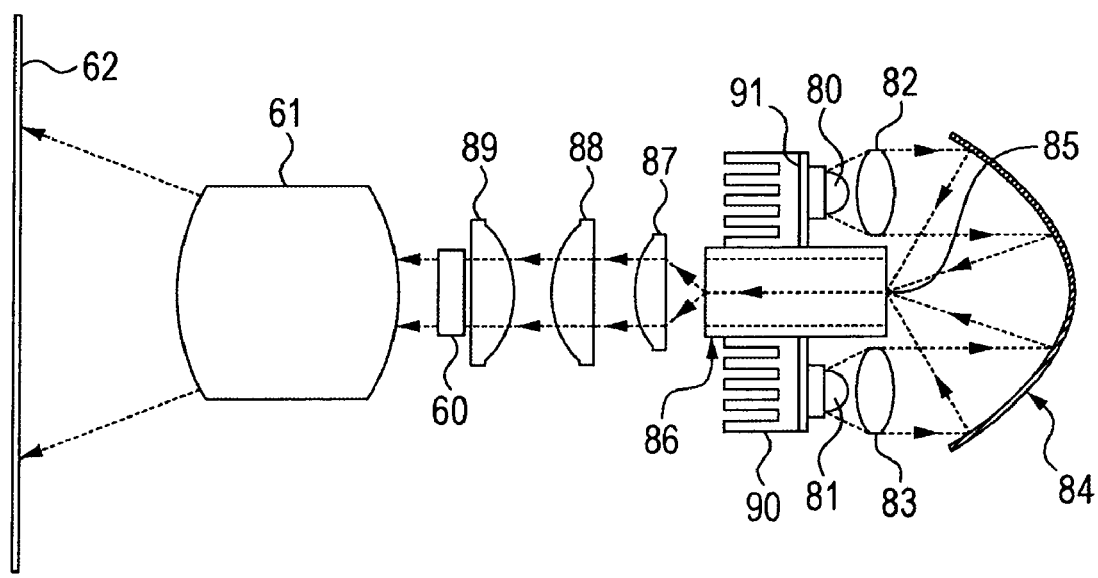
FIG. 9 is a side cross-sectional view showing the main portion of a conventional light source device.

FIGS. 6 to 8 show the light source device according to a second embodiment of the invention. FIG. 6 is a front view of the light source device. FIG. 7 is a side view and FIG. 8 is a perspective view.

In FIGS. 6 to 8, a second spheroidal mirror 74 (hereinafter referred to as "second ellipsoidal mirror") has a third focal point 76 and a fourth focal point 77 on the axis of rotation 75 of the mirror 74. The entrance aperture 50 of the light integrator 49 is disposed in the vicinity of the third focal point 76, and a plurality of illumination units 78, which is the combination of the first ellipsoidal mirror 10 and the light source unit 73 used in the first embodiment, are radially disposed with respect to the axis of rotation 75.

The light source units 73 are disposed such that the first focal point 11 of each of the light source units 73 coincides with the fourth focal point 77 of the second ellipsoidal mirror 74.

Furthermore, the angle at the fourth focal point between two straight lines passing through the second focal point 12 of the light source unit 73, the fourth focal point 77 of the second ellipsoidal mirror 74 and the third focal point 76 of the second ellipsoidal mirror 74 (the straight line passing through the second focal point 12 and the first focal point 11 of the light source unit 73, and the straight line passing through the fourth focal point 77 and the third focal point 76), that is, the angle at the fourth focal point between the axis of rotation 75 of the second spheroidal mirror and the axis of rotation 101 of the first spheroidal mirror, is greater than or equal to 90 degrees.

Therefore, even when a plurality of illumination units 78 are radially disposed with respect to the axis of rotation 75, emission light 79 from each of the illumination units 78 will not interfere with the first ellipsoidal mirror 10 disposed at a substantially opposite position, thereby increasing the brightness of emission light as compared to the case using only one illumination unit 78.

Since the second spheroidal mirror and the first spheroidal mirror are disposed such that their axes of rotation 75 and 101 form an angle of 90 degrees or greater, there is advantageously provided a highly bright light source device in which emission light from numerous illumination units 78 can be focused to the entrance aperture of the light integrator 49.

Furthermore, the light source device can be adapted to a projection-type image display apparatus for monitoring purposes having a high priority need to immediately replace a light source when it has failed or reached its service life and restore the normal state.

Although the invention has been described with reference to the case where a light emitting diode is used as each of the semiconductor light emitting elements used in the light source of the light source unit, the semiconductor light emitting element may be replaced with a laser light source, an optical fiber for guiding the light emitted from the laser light source, or a combination of a light emitting diode and a laser light source. Such a configuration will provide similar advantages.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A light source device comprising:
    a first spheroidal mirror having first and second focal points; and
    a light source unit having a plurality of semiconductor light emitting elements radially disposed on a support with respect to the axis of rotation of the first spheroidal mirror, light beams from the semiconductor light emitting elements passing through the second focal point, reflecting from the inner surface of the first spheroidal mirror, and being focused to the first focal point, the axis of rotation and the light emission central axis of each of the semiconductor light emitting elements forming an angle of 90 degrees or greater,
    wherein the light source unit is removably attached to an opening provided at a non-reflective portion of the first spheroidal mirror so as to form an illumination unit.

2. The light source device according to claim 1, further comprising a columnar optical element that has an entrance aperture and an exit aperture and generates a secondary light source, wherein the first focal point of the first spheroidal mirror is located at the entrance aperture of the columnar optical element.

3. The light source device according to claim 1, wherein the support for the semiconductor light emitting elements removably fits in the opening of the first spheroidal mirror.

4. The light source device according to claim 1, wherein the portion of the support for the semiconductor light emitting elements that makes contact with the semiconductor light emitting elements is made of material with high thermal conductivity and is provided with a radiation fin.

5. The light source device according to claim 1, further comprising a second spheroidal mirror having third and fourth focal points,
    wherein a plurality of the illumination units are radially disposed with respect to the axis of rotation of the second spheroidal mirror,
    the first focal point of the first spheroidal mirror is located at a position that coincides with the fourth focal point, and
    at the fourth focal point, the axis of rotation of the second spheroidal mirror and the axis of rotation of the first spheroidal mirror form an angle of 90 degrees or greater.

6. The light source device according to claim 5, further comprising a columnar optical element that has an entrance aperture and an exit aperture and generates a secondary light source, wherein the third focal point of the second spheroidal mirror is located at the entrance aperture of the columnar optical element.

* * * * *